United States Patent
Zheng et al.

(10) Patent No.: US 10,275,057 B2
(45) Date of Patent: Apr. 30, 2019

(54) ARRAY SUBSTRATE, DISPLAY PANEL AND METHOD FOR DETECTING AND RESTORING DISPLAY PANEL

(71) Applicants: Xiamen Tianma Micro-Electronics Co., Ltd., Xiamen (CN); Tianma Micro-Electronics Co., Ltd., Shenzhen (CN)

(72) Inventors: Chao Zheng, Xiamen (CN); Min Huang, Xiamen (CN); Zhonghuai Chen, Xiamen (CN); Kangpeng Yang, Xiamen (CN); Yumin Xu, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 422 days.

(21) Appl. No.: 15/162,624

(22) Filed: May 24, 2016

(65) Prior Publication Data

US 2017/0192547 A1    Jul. 6, 2017

(30) Foreign Application Priority Data

Dec. 30, 2015   (CN) .......................... 2015 1 1022535

(51) Int. Cl.
*G06F 3/041* (2006.01)
*G09G 3/20* (2006.01)
(Continued)

(52) U.S. Cl.
CPC ............ *G06F 3/041* (2013.01); *G06F 3/0416* (2013.01); *G06F 11/2221* (2013.01); *G09G 3/2092* (2013.01); *G06F 3/044* (2013.01)

(58) Field of Classification Search
None
See application file for complete search history.

(56) References Cited

U.S. PATENT DOCUMENTS

| | | | |
|---|---|---|---|
| 2014/0104251 A1* | 4/2014 | Zhang | G09G 3/3611 345/205 |
| 2016/0170560 A1* | 6/2016 | Zhan | G06F 3/0416 345/174 |
| 2016/0349917 A1* | 12/2016 | Bai | G02F 1/13 |

FOREIGN PATENT DOCUMENTS

| | | |
|---|---|---|
| CN | 103914176 A | 7/2014 |
| CN | 104503110 A | 4/2015 |

* cited by examiner

*Primary Examiner* — Amr A Awad
*Assistant Examiner* — Donna V Lui
(74) *Attorney, Agent, or Firm* — Kilpatrick Townsend & Stockton, LLP

(57) ABSTRACT

The present disclosure provides an array substrate, a display panel and a method for detecting and restoring a display panel. The detection and restoring unit is configured to provide signals to the touch sensing units to perform detection and restoring. In the display region, each of the touch sensing units is provided with one first line and one second line, and the first line is connected with the touch sensing unit through a via hole. The first terminal of the first switch element is connected with a first terminal of the first line. The second terminal of the first switch element is connected with a first terminal of the second line. Each of the first terminal of the first line, the first terminal of the second line and the control terminal of the first switch element is connected with the detection and restoring unit.

15 Claims, 7 Drawing Sheets

(51) Int. Cl.
*G06F 11/22* (2006.01)
*G06F 3/044* (2006.01)

ARRAY SUBSTRATE, DISPLAY PANEL AND METHOD FOR DETECTING AND RESTORING DISPLAY PANEL

CROSS REFERENCE

This application is based upon and claims priority to Chinese Patent Application No. 201511022535.X, filed on Dec. 30, 2015, the entire contents thereof are incorporated herein by reference.

TECHNICAL FIELD

The present disclosure relates to the field of display technology, and more particularly, to an array substrate, a display panel and a method for detecting and restoring a display panel.

BACKGROUND

An existing display panel generally has both a display function and a touch function, and generally formed by providing a touch sensing electrode layer inside the display panel during the manufacturing process of the display panel, so as to implement the touch sensing function.

During the process of forming the touch sensing electrode layer, lines for connecting the touch sensing units and the integrated circuits may be disconnected, causing fails in corresponding touch sensing units. In this regard, it is necessary to detect whether the touch function operates normally. To detect the touch function of the touch sensing units, detection signals are sent to the touch sensing units, and the connection and disconnection will be displayed in a checkerboard-like image and a frame flipping image. As shown in FIG. 1, a detection circuit 11 is generally disposed at a top end of a display panel 10, and a display region A of the display panel 10 includes a plurality of touch sensing units 10 arranged in a matrix form. Detection signals are transmitted up and down from the detection circuit. In this way, only disconnection in the circuit between the detection circuit and a via hole can be detected. In this case, disconnection at a location close to the integrated circuit (i.e. a circuit between a via hole and the integrated circuit) as shown in FIG. 1, cannot be detected. In other words, whether there is disconnection in the circuit between the via hole W and the integrated circuit 12 cannot be detected. Therefore, touch sensing signals sent from the integrated circuit cannot be transmitted to corresponding touch sensing units, causing the touch function to fail.

In view of the above, in the prior art, there is a demand for a method which can effectively detect disconnection during detection stage.

SUMMARY

With respect to the problems in the prior art, the objective of the present disclosure is to provide an array substrate, a display panel and a method for detecting and restoring a display panel, to overcome the technical problem of the prior art that in the detection stage the disconnection cannot be effectively detected.

In accordance with one aspect of the present disclosure, there is provided an array substrate including a display region and a non-display region outside of the display region, the display region including a plurality of touch sensing units, the touch sensing units corresponding to pixel units in a pixel array on an array substrate. The non-display region including: a detection and restoring unit, a first switch element, a first line and a second line. The detection and restoring unit is configured to provide signals to the touch sensing units to perform detection and restoring. The first switch element having a first terminal, a second terminal and a control terminal. In the display region, each of the touch sensing units is provided with one first line and one second line, and the first line is connected with the touch sensing unit through a via hole. The first terminal of the first switch element is connected with a first terminal of the first line, the second terminal of the first switch element is connected with a first terminal of the second line, and each of the first terminal of the first line, the first terminal of the second line and the control terminal of the first switch element is connected with the detection and restoring unit.

In accordance with another aspect of the present disclosure, there is provided a display panel including the array substrate described above.

In accordance with still another aspect of the present disclosure, there is provided a method for detecting and restoring the display panel. The method includes in a detection stage, detecting whether disconnection occurs between the via hole on the first line and the integrated circuit unit. When it is detected that disconnection occurs between the via hole on the first line and the integrated circuit unit, the disconnection can be restored.

It can be seen from the above technical solution that the present disclosure has the following advantages. Since, a second line, in addition to the existing first line, is provided between the detection and restoring unit and the integrated circuit unit, the signal from the detection and restoring circuit can be transmitted to the touch sensing unit also through the second line, rather than only through the first line. In this way, disconnection between the via hole and the integrated circuit unit can be detected during the detection stage. When the first switch element is conducted, the restoring circuit can operate regardless in the detection stage or in the normal display stage. Such implementation of the restoring of the disconnection can ensure the touch sensing function of the array substrate operating properly in the display stage.

BRIEF DESCRIPTION OF THE DRAWINGS

Above and other objectives, features and advantages of the present disclosure will become apparent from the detailed description of exemplary embodiments with reference to the following accompanying drawings.

DETAILED DESCRIPTION

Exemplary embodiments will now be more fully described with reference to the accompanying drawings. However, the exemplary embodiments can be implemented in various forms, and should not be understood as limited to the embodiments set forth herein. On the contrary, these embodiments are provided to make the present disclosure thorough and complete, and to fully convey the concept of the exemplary embodiments to those skilled in the art. The accompanying drawings are only schematic illustration of the present disclosure, and not drawn to scale. Similar numeral reference denotes similar or same parts throughout the accompanying drawings, and repeat description thereof will be omitted.

In addition, the features, structures or characteristics described herein can be combined in one or more embodiments in any appropriate way. In the description herein, many specific details are provided for fully understanding of the embodiments of the present disclosure. However, it will be appreciated by those skilled in the art that the technical solution of the present disclosure can be practiced without one or more of the specific details, or with other methods, components, devices or steps, etc. In addition, known structures, methods, devices, implementations, materials or operations will not be illustrated or described in detail, to avoid obscuration of the aspects of the present disclosure.

Figure 1:
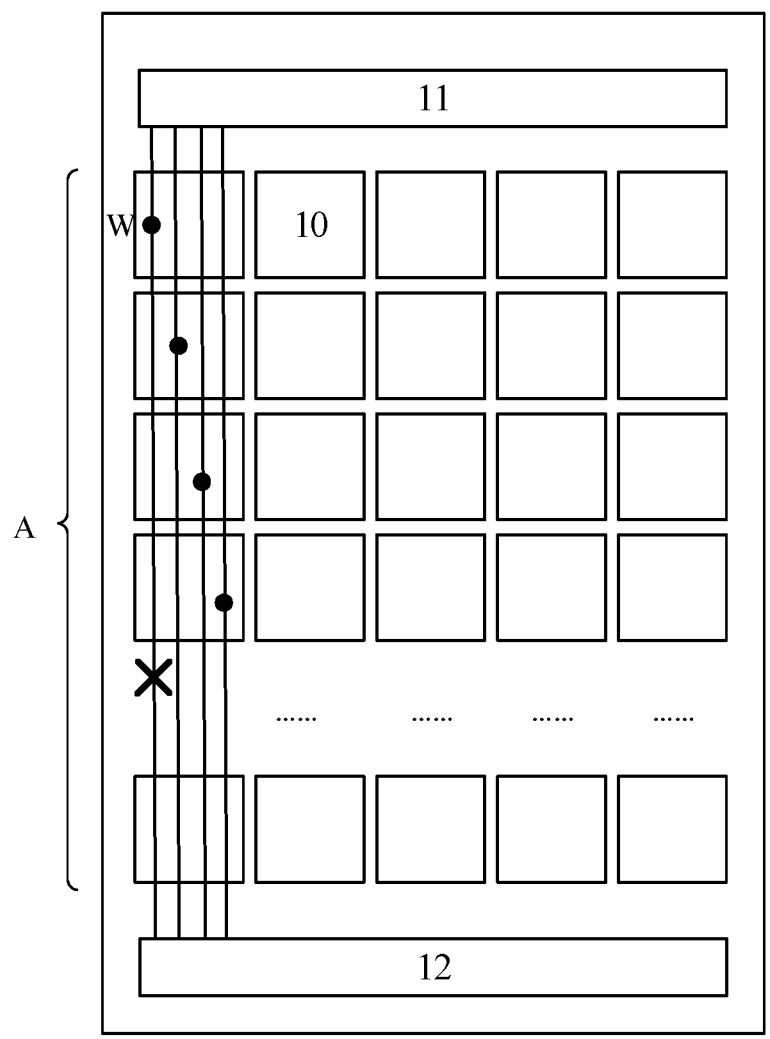
FIG. 1 is a schematic diagram of detection of a display panel in the prior art.
Figure 2:
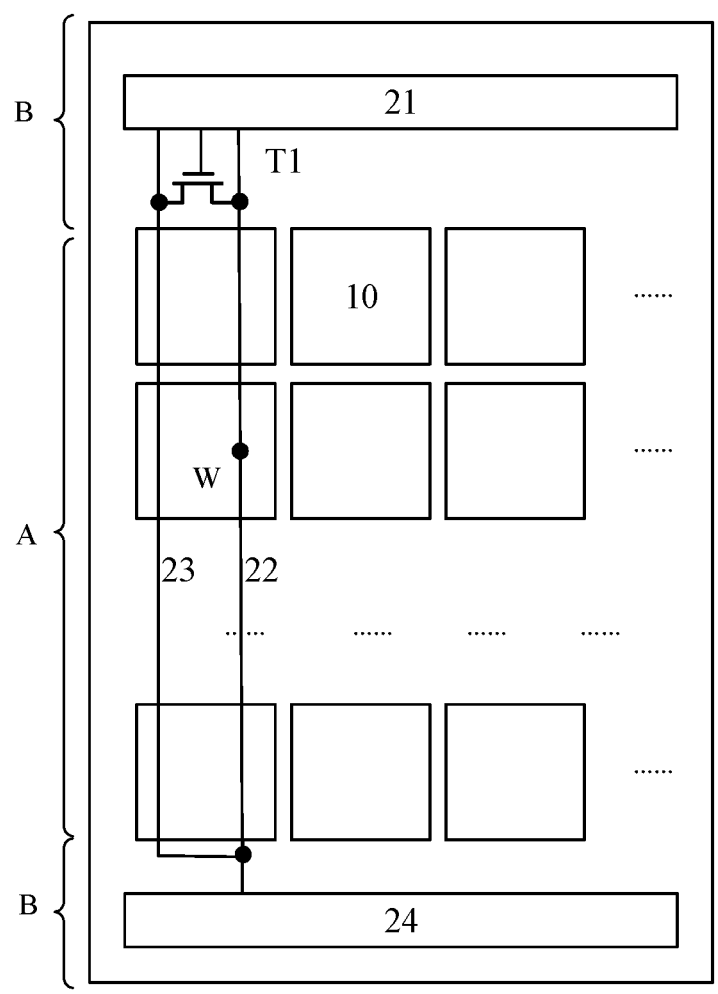
FIG. 2 is a schematic diagram of an array substrate provided by a first embodiment.

One embodiment provides an array substrate. As shown in FIG. 2, the array substrate in this embodiment includes a display region A and a non-display region B outside of the display region. The display region A includes a plurality of touch sensing units 10, the touch sensing units 10 corresponding to pixel units in a pixel array on an array substrate. The non-display region B includes a detection and restoring unit 21, a first switch element T1 and an integrated circuit unit 24.

The detection and restoring unit 21 is configured to provide signals to the touch sensing units 10 to perform detection and restoring. The first switch element T1 has a first terminal, a second terminal and a control terminal. In the display region A, each of the touch sensing units 10 corresponds to one first line 22 and a second line 23. The first line 22 is electrically connected with a corresponding touch sensing unit 10 through a via hole W. The first terminal of the first switch element T1 is connected with a first terminal of the first line, and the second terminal of the first switch element T1 is connected with a first terminal of the second line 23. Each of the first terminal of the first line 22, the first terminal of the second line 23 and the control terminal of the first switch element T1 is connected with the detection and restoring unit 21. In addition, a second terminal of the first line 22 is connected with a second terminal of the second line 23, and the second terminal of the first line 22 is also connected with the integrated circuit unit 24.

As shown in FIG. 2, the integrated circuit unit 24 and the detection and restoring unit 21 are disposed at opposite sides of the display region A. That is, the integrated circuit unit 24 and the detection and restoring unit 21 are disposed in the non-display region B, and respectively at opposite sides of the display region A. However, in other embodiments of the present disclosure, the integrated circuit unit 24 and the detection and restoring unit 21 can be disposed at the same side of the display region A. Therefore, in the present disclosure, the integrated circuit unit 24 and the detection and restoring unit 21 can be disposed at opposite sides or the same side of the display region A.

As shown in FIG. 2, the first line 22 and the second line 23 are connected, at two terminals thereof respectively, to the integrated circuit unit 24 and the detection and restoring unit 21 in the non-display region B through the touch sensing units in the display region A. The first line 22 is electrically connected with one touch sensing unit 10 through a via hole W. The first line 22, the second line 23, the detection and restoring unit 21 and the integrated circuit unit 24 form a loop circuit.

As shown in FIG. 2, by additionally providing a second line 23, signals from the detection and restoring circuit 21 can be transmitted to the touch sensing units 10 through the second line 23, rather than transmitted to the touch sensing units 10 through merely one route of the first line 22. Thus, disconnection between the via hole W and the integrated circuit unit 24 can be detected during the detection stage.

Figure 3:
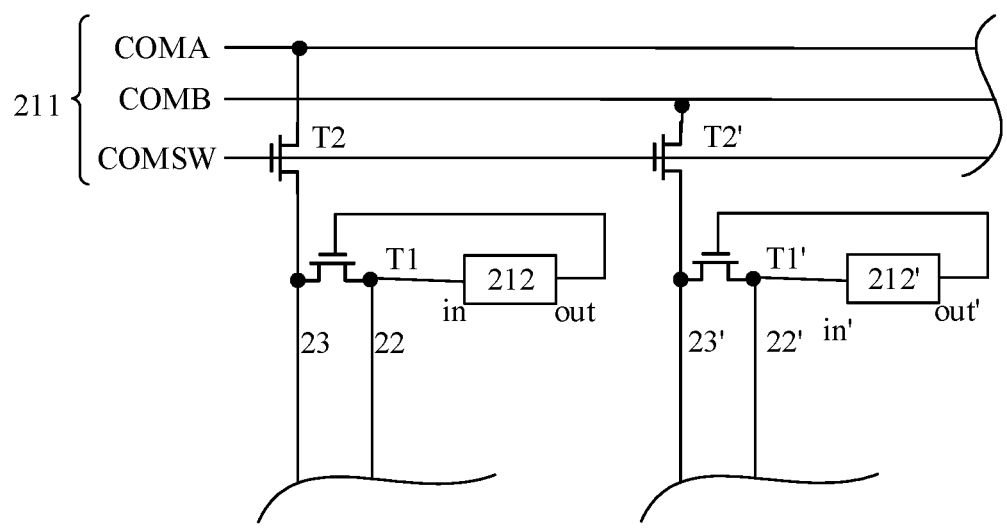
FIG. 3 is a circuit diagram of a detection and restoring circuit on the array substrate provided by the first embodiment.

As shown in FIG. 3, the detection and restoring unit 21, in this embodiment, includes a detection circuit 211 configured to detect disconnection in the array substrate and a restoring circuit 212 configured to restore disconnection in the array substrate.

The detection circuit 211 is connected with the first terminal of the first switch element T1 and the first terminal of the second line 23. The detection circuit 211 includes a second switch element T2, at least one detection signal line COM and a control signal line COMSW. The second switch element T2 has a first terminal, a second terminal and a control terminal. Each of the at least one detection signal line COM provides a detection signal. The first terminal of the second switch element T2 is connected with the detection signal line. The second terminal of the second switch element T2 is connected with the first terminal of the first switch element T1 and the first terminal of the second line 23. The control signal line COMSW is connected with the control terminal of the second switch element T2, and provides a voltage thereto to control the second switch element T2 to be turned on or off.

In FIG. 3, for example, two detection signal lines COMA and COMB are provided. Each of the detection signal lines forms one detection circuit with the second switch element. Specifically, the detection signal line COMA is connected with the first terminal of the second switch element T2, and the second terminal of the second switch element T2 is connected with the first terminal of the first switch element T1 and the first terminal of the second line 23. The detection signal line COMB is connected with a first terminal of a second switch element T2'. A second terminal of the second switch element T2' is connected with a first terminal of a first switch element T1' and a first terminal of a second line 23'. A plurality of touch sensing units are disposed in the display region, and each of the touch sensing units are controlled by one first line and one second line.

As shown in FIG. 3, the restoring circuit 212 has an input terminal in and an output terminal out. The input terminal in is connected with the second terminal of the first switch element T1 and the first terminal of the first line 22. The output terminal out is connected with the control terminal of the first switch element T1 and outputs a voltage to control the first switch element T1 to be turned on or off. A restoring circuit 212' has an input terminal in' and an output terminal out'. The input terminal in' is connected with the second terminal of the first switch element T1' and the first terminal of the first line 22'. The output terminal out' is connected with the control terminal of the first switch element T1' and outputs a voltage to control the first switch element T1' to be turned on or off.

Figure 4:
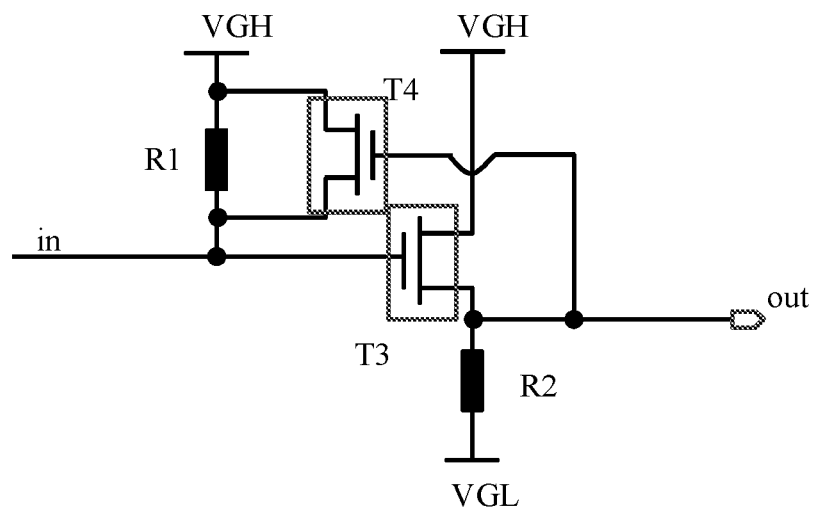
FIG. 4 is a circuit diagram of a restoring circuit 212 of FIG. 3.

FIG. 4 is a circuit diagram of the restoring circuit 212 of FIG. 3. As shown in FIG. 4, the restoring circuit 212 includes a third switch element T3 and a fourth switch element T4. The third switch element T3 has a first terminal, a second terminal and a control terminal. The first terminal of the third switch element T3 is connected with a first voltage level, the second terminal of the third switch element T3 is connected with the output terminal out of the restoring circuit, and connected with a second voltage level through a first resistor (pull-down resistor) R2, and the control terminal of the third switch element T3 is connected with the input terminal in of the restoring circuit. The fourth switch element T4 also has a first terminal, a second terminal and a control terminal. The first terminal of the fourth switch element T4 is connected with the first voltage level, the second terminal of the fourth switch element T4 is connected with the control terminal of the third switch element T3, a second resistor (pull-up resistor) R1 is connected between the first terminal and the second terminal of the fourth switch element T4, and the control terminal of the fourth switch element T4 is connected with the second terminal of the third switch element T3 and connected with the output terminal out of the restoring circuit. In the present embodiment, the first voltage level is a high level VGH, and the second voltage level is a low level VGL.

In this embodiment, a signal input to the input terminal in of the restoring circuit is 0V or ±5V, and a threshold voltage of the third switch element T3 is 6V. In a detection stage or a normal operation stage of the display panel, the voltage 0V or ±5V at the input terminal in of the restoring circuit cannot turn on the third switch element T3 with the threshold voltage of 6V. Thus, the output terminal out of the restoring circuit outputs a low level VGL.

In this embodiment, the detection and restoring circuit has two operation stages: a detection stage and a normal operation stage following the detection stage. The detection stage includes two situations.

The first situation is that in the detection stage, no disconnection occurs in a circuit close to the IC unit (i.e. a segment of circuit between a via hole on the first line and the integrated circuit unit).

Figure 5:
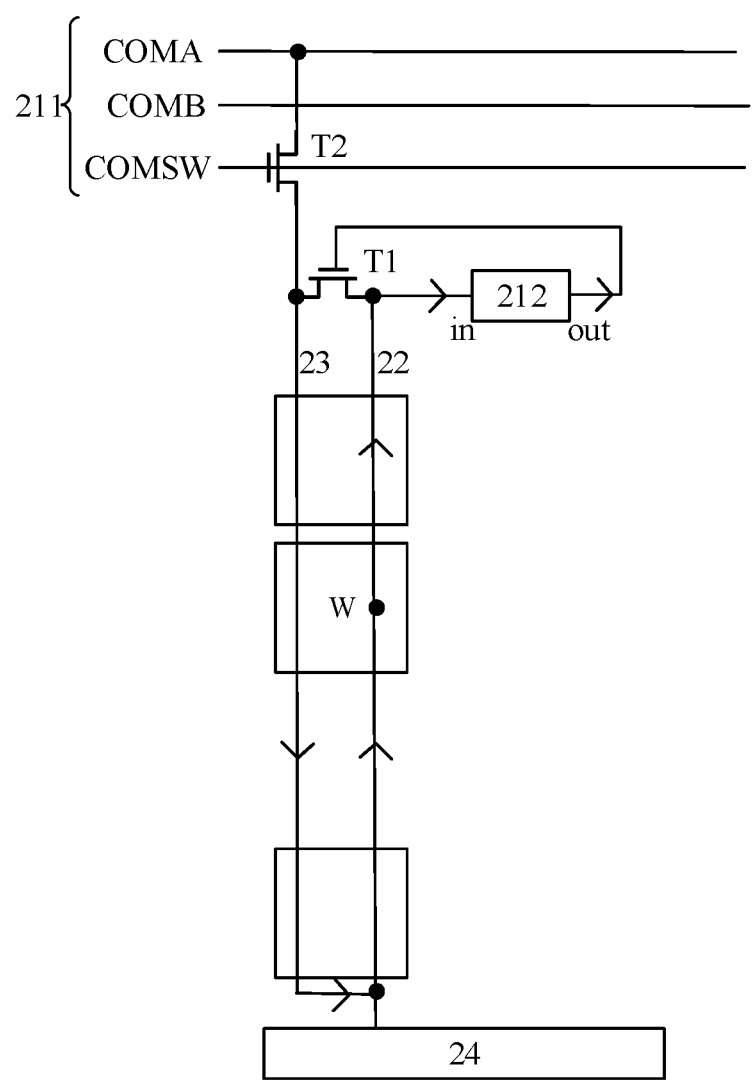
FIG. 5 is a diagram of a signal transmission route when no disconnection is detected during a detection stage according to the first embodiment.

FIG. 5 is a diagram of a signal transmission route when no disconnection is detected during the detection stage. In this case, since the voltage at the input terminal in of the restoring circuit is 0V or ±5V, and the third switch element T3 cannot be turned on with the threshold voltage of 6V, the output terminal out of the restoring circuit outputs a low level VGL, the first switch element T1 is turned off and the restoring circuit is disabled. The transmission route of a detection signal is shown in FIG. 5, that is, after the detection signal line COMA sends a detection signal, if the control signal line COMSW controls the second switch element T2 to be turned on, the detection signal is transmitted in a direction of an arrow on the second line 23. After passing through the joint of the first line 22 and the second line 23, the detection signal is transmitted in a direction of an arrow on the first line 22, arriving at the via hole W finally. Since in detection, the transmission route of the signal passes through the second line 23, and thereby disconnection of the circuit between the via hole W on the first line 22 and the integrated circuit unit 24 can be detected, the objective of detection the entire panel and detection whether this segment of circuit operates normally can be implemented.

The second situation is that in the detection stage, disconnection occurs in a circuit close to the IC unit (i.e. a segment of circuit between a via hole on the first line and the integrated circuit unit).

Figure 6:
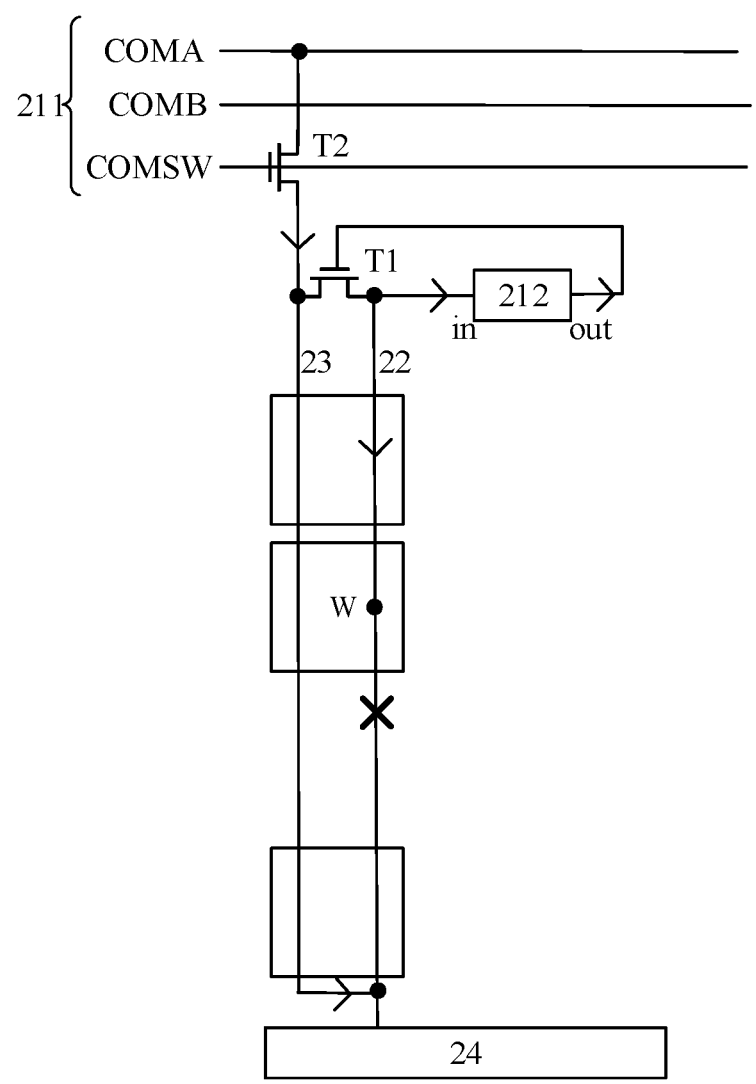
FIG. 6 is a diagram of a signal transmission route when disconnection is detected during a detection stage according to the first embodiment.

FIG. 6 is a diagram of a signal transmission route when disconnection is detected during the detection stage. Referring to FIGS. 4 and 6, in this case, since disconnection occurs in a circuit close to the IC unit, the input terminal in of the restoring circuit is suspended, the voltage VGH at the pull-up resistor R1 controls the third switch element T3 to be turned on. Meanwhile, the output terminal out of the restoring circuit also outputs a high level, to turn on the first switch element T1. The transmission route of a detection signal is shown in FIG. 6, that is, after the detection signal line COMA sends a detection signal, if the control signal line COMSW controls the second switch element T2 to be turned on, the detection signal is transmitted to the joint of the first terminal of the second line 23 and the first switch element T1. Since the first switch element T1 is turned on at this moment, the detection signal is transmitted from the second terminal of the first switch element T1 to the restoring circuit 212, and transmitted to the via hole W along a direction of an arrow on the first line 22.

When disconnection occurs in a circuit close to the IC unit, the input terminal in of the restoring circuit is suspended, the voltage VGH at the pull-up resistor R1 is supplied to the third switch element T3 to turn on the third switch element T3. Meanwhile, the output terminal out of the restoring circuit also outputs a high level VGH to turn on the fourth switch element T4. Afterwards, the signal from the input terminal in of the restoring circuit changes to the normal 0V or ±5V, and the fourth switch element T4 remains turned on.

Figure 7:
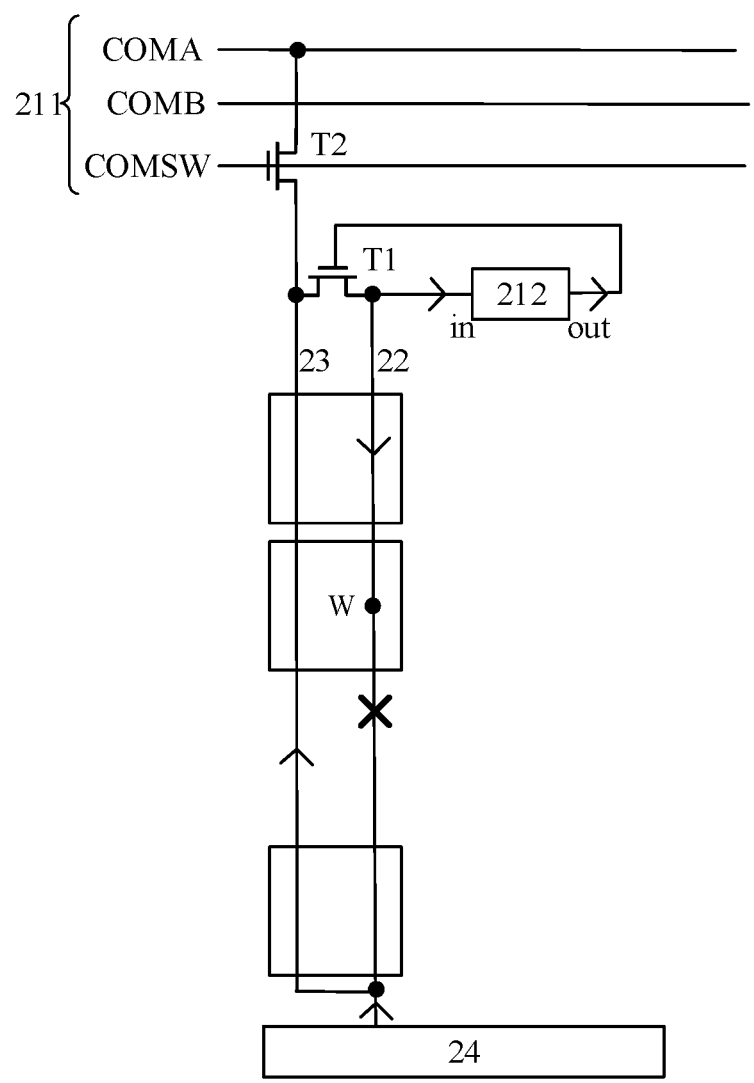
FIG. 7 is a diagram of a signal transmission route when disconnection is detected during a display stage according to the first embodiment.

FIG. 7 is a diagram of a signal transmission route when disconnection is detected during a display stage. After the detection stage, during the display stage of the display panel, the detection circuit does not operate, the restoring circuit remains in an operation mode and the first switch element T1 remains being conducted. If disconnection occurs in a circuit close to the IC unit, a signal sent from the integrated circuit unit IC is transmitted along a direction of an arrow on the second line 23 as shown in FIG. 7. Since at this time, the first switch element T1 is conducted, the signal is output from the second terminal of the first switch element T1 to the input terminal in of the restoring circuit, and transmitted to the via hole W along a direction of an arrow on the first line 22. In this way, the signal can bypass the disconnection line, and the malfunction caused by restoring the disconnection close to the IC unit can be solved.

The detection and restoring unit provided by the present embodiment not only includes a detection circuit, but also includes a restoring circuit, therefore, the detection and restoring unit can detect disconnection and automatically restore the detected disconnection. Each of the touch sensing units can be restored with the restoring circuit as shown in FIG. 3. In addition, the transmission route of the signal can be controlled by turning on and off the first switch element. Once the disconnection in the circuit is detected, the disconnection portion can be automatically bypassed, thereby it can avoid the influence of the disconnection on the touch sensing function of the touch sensing unit.

In the display stage, the input terminal in of the restoring circuit is suspended, to turn on the first switch element T1. Then, the signal sent from the integrated circuit unit 24 has a transmission route as shown in FIG. 7. Therefore, as long as the restoring circuit is enabled, disconnection can be restored regardless in the detection stage or in the display stage.

Accordingly, in the array substrate provided by this embodiment, in addition to the existing first line, one second line is provided between the detection and restoring unit and the integrated circuit unit. Thus, one single touch sensing unit is controlled by two lines, and the existing first line is connected with a touch sensing unit through a via hole. By additionally providing the second line, the signal from the detection and restoring circuit can be transmitted to the touch sensing unit also through the second line, rather than only through the first line. In this way, disconnection between the via hole and the integrated circuit unit can be detected during the detection stage. Moreover, since a first switch element is provided at a location where the additionally provided line and the existing line are connected with the detection and restoring unit, when the first switch element is conducted, the restoring circuit can remain in an operation mode whether in the detection stage or in the normal display stage. Such implementation of the restoring of the disconnection can thus ensure the touch sensing function of the array substrate operating properly in the display stage.

Embodiments also provide a display panel is further provided, including the array substrate in the above embodiment and a color film substrate, each of the touch sensing units of the array substrate corresponds to a pixel unit of a pixel array on the color film substrate.

Accordingly, in addition to the existing first line, a second line is provided between the detection and restoring unit and the integrated circuit unit. Thus, one single touch sensing unit is controlled by two lines, and the existing first line is connected with a touch sensing unit through a via hole. By additionally providing the second line, the signal from the detection and restoring circuit can be transmitted to the touch sensing unit also through the second line, rather than only through the first line. In this way, disconnection between the via hole and the integrated circuit unit can be detected during the detection stage. Moreover, since a first switch element is provided at a location where the additionally provided line and the existing line are connected with the detection and restoring unit, when the first switch element is conducted, the restoring circuit can remain operated regardless in the detection stage or in the normal display stage, thus implementing the restoring of the disconnection and ensuring the touch sensing function of the array substrate operating properly in the display stage.

Embodiments provide a method for detecting and restoring a display panel. The array substrate of the display panel is as shown in FIG. 2, including a display region A and a non-display region B outside of the display region. The display region A includes a plurality of touch sensing units 10, each of the touch sensing units 10 corresponding to a pixel unit in a pixel array on a color film substrate. The non-display region B includes a detection and restoring unit 21, a first switch element T1, a first line 22, a second line 23 and an integrated circuit unit 24. The circuit components of each unit and the connection relationship between lines are shown in FIGS. 2-4, which will not be repeated herein.

Figure 8:
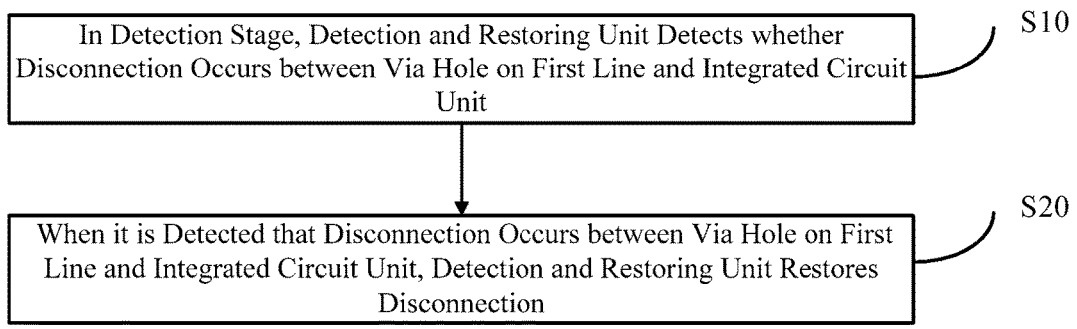
FIG. 8 is a flowchart of a method for detecting and restoring a display panel provided by a third embodiment.

The method for detecting and restoring a display panel has a process of a detection stage, as shown in FIG. 8, including the following steps.

In step S10, in a detection stage, the detection and restoring unit detects whether disconnection occurs between the via hole on the first line and the integrated circuit unit.

In step S20, when it is detected that disconnection occurs between the via hole on the first line and the integrated circuit unit, the disconnection can be restored. In some embodiments, step S20 can be performed by a detection and restoring unit the same as or substantially similar to the detection and restoring unit described and illustrated herein.

If no disconnection occurs between the via hole on the first line and the integrated circuit unit, a high voltage level can be provided by the control signal, to turn on the second switch element, and a detection signal can be provided by the detection signal line to the second line. At this time, the first switch element is turned off, and the detection signal input from the detection circuit, through the conducted circuit between the second terminal of the second line and the second terminal of the first line, is transmitted to the touch sensing unit which is connected with the via hole.

If no disconnection is detected in step S10, the first switch element T1 is turned off and the restoring circuit is not enabled. At this time, only the detection signal output from the detection circuit passes through the first line and the second line and bypasses the disconnection in the circuit, and is transmitted to the via hole. Specifically, as the signal transmission route shown in FIG. 5, after the detection signal line COMA sends a detection signal, if the control signal line COMSW controls the second switch element T2 to be turned on, the detection signal is transmitted in a direction of an arrow on the second line 23. After passing through the joint of the first line 22 and the second line 23, the detection signal is transmitted in a direction of an arrow on the first line 22, arriving at the via hole W finally. Since the detection signal can be transmitted to the via hole through the additionally provided second line, disconnection in the circuit can be detected more fully and more effectively.

In step S20, if there is disconnection on the first line between the via hole and the integrated circuit, the input terminal of the restoring circuit is suspended. Then, the restoring circuit is enabled, the first switch element is conducted, and signals input from the detection signal line in the detection circuit are transmitted to the touch sensing unit which is connected with the via hole through the first switch element. When the restoring circuit is enabled, if the input terminal of the restoring circuit is suspended, the high voltage level will turn the third switch element on, the output voltage of the restoring circuit is a high voltage level to turn on the first switch element; and the output voltage of the restoring circuit is a high voltage level to turn on the fourth switch element. Then, the high voltage level is applied on the control terminal of the third switch element to maintain the third switch element in the conducted state. At this time, the detection signal transmission route is as shown in FIG. 6, when the first switch element T1 is conducted, detection signals input by the detection signal line are transmitted from the second terminal of the first switch element T1 and the first terminal of the first line to the via hole W. Since at this time the restoring circuit is enabled to restore the disconnection in the circuit, the restoring circuit will be maintained in the operation state afterwards.

After the detection is completed, i.e. the display stage is entered, and the detection circuit will not operate any more, and only the restoring circuit is enabled. At this time, the first switch element is conducted, signals input from the integrated circuit unit will be transmitted to the second terminal of the first switch element through the first terminal of the second line, transmitted from the first terminal of the first switch element to the first terminal of the first line, and finally to the touch sensing unit which is connected with the via hole. The detection signal transmission route is as shown in FIG. 7. The input terminal in of the restoring circuit is suspended to turn on the first switch element T1. As long as the restoring circuit is in the enabled state, the disconnection can be restored regardless in the detection stage or in the display stage.

It should be noted that, in the display stage, the touch sensing units are reused as common electrodes, and voltages of the common electrodes are transmitted through the first lines and/or the second lines.

The technical effect in accordance with the disclosure lies in that, one single touch sensing unit is controlled by two lines, and the existing first line is connected with a touch sensing unit through a via hole. By additionally providing the second line, the signal from the detection and restoring circuit can be transmitted to the touch sensing unit also through the second line, rather than only through the first line. In this way, disconnection between the via hole and the integrated circuit unit can be detected during the detection stage. Moreover, since a first switch element is provided at a location where the additionally provided line and the existing line are connected with the detection and restoring unit, when the first switch element is conducted, the restoring circuit can remain in an operation mode regardless in the detection stage or in the normal display stage, thus implementing the restoring of the disconnection and ensuring the touch sensing function of the array substrate operating properly in the display stage.

The exemplary embodiments of the present disclosure have been illustrated and described in the above. It should be understood that the present disclosure is not limited to the detailed structure, configuration or implementation described herein. On the contrary, it is intended that various modifications and equivalent solutions within the spirit and scope of the claims appended should be covered by the present disclosure.

What is claimed is:

1. An array substrate comprising a display region and a non-display region outside of the display region, the display region comprising a plurality of touch sensing units, the touch sensing units corresponding to pixel units in a pixel array on an array substrate, the non-display region comprising:
   a detection and restoring unit configured to provide signals to the touch sensing units to perform detection and restoring; and
   a first switch element having a first terminal, a second terminal and a control terminal; and, wherein
   in the display region, each of the touch sensing units is provided with a first line and a second line, wherein the first line is connected with the touch sensing unit through a via hole; and
   the first terminal of the first switch element is connected with a first terminal of the first line, the second terminal of the first switch element is connected with a first terminal of the second line, and each of the first terminal of the first line, the first terminal of the second line and the control terminal of the first switch element is connected with the detection and restoring unit,
   wherein the detection and restoring unit comprises:
   a detection circuit connected with the first terminal of the first switch element and the first terminal of the second line, and configured to detect disconnection in the array substrate, and
   wherein the detection circuit comprises:
   a second switch element having a first terminal, a second terminal and a control terminal; and
   at least one detection signal line, each detection signal line providing a detection signal; and, wherein
   the first terminal of the second switch element is connected with the detection signal line, the second terminal of the second switch element is connected with the first terminal of the first switch element and the first terminal of the second line.

2. The array substrate of claim 1, wherein the detection circuit further comprises:
   a control signal line connected with the control terminal of the second switch element, a voltage of the control signal line controlling the second switch element to be turned on or off.

3. The array substrate of claim 1, wherein the non-display region further comprises an integrated circuit unit, a second terminal of the first line is connected with a second terminal of the second line, and the second terminal of the first line is also connected with the integrated circuit unit.

4. The array substrate of claim 3, wherein the integrated circuit unit and the detection and restoring unit are disposed at the same side or at opposite sides of the display region.

5. A display panel comprising the array substrate of claim 1.

6. A method for detecting and restoring the display panel of claim 5, comprising:
   in a detection stage, detecting whether a disconnection occurs between the via hole on the first line and the integrated circuit unit and when it is detected that disconnection occurs between the via hole on the first line and the integrated circuit unit, the disconnection is restored.

7. The method of claim 6, wherein
   in a display stage, reusing the detection signal line as common electrodes, and voltages of the common electrodes are transmitted through the first lines and/or the second lines.

8. An array substrate comprising a display region and a non-display region outside of the display region, the display region comprising a plurality of touch sensing units, the touch sensing units corresponding to pixel units in a pixel array on an array substrate, the non-display region comprising:
   a detection and restoring unit configured to provide signals to the touch sensing units to perform detection and restoring; and
   a first switch element having a first terminal, a second terminal and a control terminal; and, wherein
   in the display region, each of the touch sensing units is provided with a first line and a second line, wherein the first line is connected with the touch sensing unit through a via hole; and
   the first terminal of the first switch element is connected with a first terminal of the first line, the second terminal of the first switch element is connected with a first terminal of the second line, and each of the first terminal of the first line, the first terminal of the second line and the control terminal of the first switch element is connected with the detection and restoring unit,
   wherein the detection and restoring unit comprises:
   a detection circuit connected with the first terminal of the first switch element and the first terminal of the second line, and configured to detect disconnection in the array substrate; and
   a restoring circuit having an input terminal and an output terminal, configured to restore disconnection in the array substrate, wherein the input terminal of the restoring circuit is connected with the second terminal of the first switch element and the first terminal of the first line, and the output terminal of the restoring circuit is connected with the control terminal of the first switch element, and the restoring circuit is configured to output a voltage to control the first switch element to be turned on or off.

9. The array substrate of claim 8, wherein the restoring circuit comprises:
a third switch element having a first terminal, a second terminal and a control terminal; and, wherein
the first terminal of the third switch element is connected with a first voltage level, the second terminal of the third switch element is connected with the output terminal of the restoring circuit, the second terminal of the third switch element is connected with a second voltage level through a first resistor, and the control terminal of the third switch element is connected with the input terminal of the restoring circuit.

10. The array substrate of claim 9, wherein the restoring circuit further comprises:
a fourth switch element having a first terminal, a second terminal and a control terminal; and, wherein
the first terminal of the fourth switch element is connected with the first voltage level, the second terminal of the fourth switch element is connected with the control terminal of the third switch element, a second resistor is connected to the first terminal and is connected with the second terminal of the fourth switch element, and the control terminal of the fourth switch element is connected with the second terminal of the third switch element and connected with the output terminal of the restoring circuit.

11. The array substrate of claim 9, wherein the first voltage level is a high voltage level and the second voltage level is a low voltage level.

12. A method for detecting and restoring a display panel comprising an array substrate, the array substrate comprising a display region and a non-display region outside of the display region, the display region comprising a plurality of touch sensing units, the touch sensing units corresponding to pixel units in a pixel array on an array substrate, the non-display region comprising:
a detection and restoring unit configured to provide signals to the touch sensing units to perform detection and restoring; and
a first switch element having a first terminal, a second terminal and a control terminal; and, wherein
in the display region, each of the touch sensing units is provided with a first line and a second line, wherein the first line is connected with the touch sensing unit through a via hole; and
the first terminal of the first switch element is connected with a first terminal of the first line, the second terminal of the first switch element is connected with a first terminal of the second line, and each of the first terminal of the first line, the first terminal of the second line and the control terminal of the first switch element is connected with the detection and restoring unit,
wherein the method for detecting and restoring the display panel comprises:
in a detection stage, detecting whether a disconnection occurs between the via hole on the first line and the integrated circuit unit and when it is detected that disconnection occurs between the via hole on the first line and the integrated circuit unit, the disconnection is restored, and
when no disconnection occurs between the via hole on the first line and the integrated circuit unit:
a high voltage level is provided by the control signal line, to turn on a second switch element, and a detection signal by the detection signal line to the second line; and
the first switch element is turned off, and a detection signal input from the detection circuit, through a conducted circuit between the second terminal of the second line and the second terminal of the first line, is transmitted to the touch sensing unit which is connected with the via hole.

13. The method of claim 12, wherein the method for detecting and restoring the display panel further comprises:
when there is a disconnection on the first line between the via hole and the integrated circuit, the input terminal of the restoring circuit is suspended, the restoring circuit is enabled, the first switch element is conducted, and signals input from the detection signal line in the detection circuit are transmitted to the touch sensing unit which is connected with the via hole through the first switch element.

14. The method of claim 13, wherein
when the restoring circuit is enabled, if the input terminal of the restoring circuit is suspended, a high voltage level will turn the third switch element on, the output voltage of the restoring circuit is a high voltage level to turn on the first switch element; and
the output voltage of the restoring circuit is a high voltage level to turn on the fourth switch element, the high voltage level is applied on the control terminal of the third switch element to maintain the third switch element in a conducted state.

15. The method of claim 13, wherein
after the detection is completed, only the restoring circuit is enabled, the first switch element is conducted, signals input from the integrated circuit unit are transmitted to the second terminal of the first switch element through the first terminal of the second line, transmitted from the first terminal of the first switch element to the first terminal of the first line, and to the touch sensing unit which is connected with the via hole.

* * * * *